United States Patent
Cook et al.

(10) Patent No.: US 11,506,389 B2
(45) Date of Patent: *Nov. 22, 2022

(54) GAS TURBINE LOAD/UNLOAD PATH CONTROL

(71) Applicant: General Electric Company, Schenectady, NY (US)

(72) Inventors: Jason Nathaniel Cook, Simpsonville, SC (US); Jason Dean Fuller, Simpsonville, SC (US); Christopher James Wenner, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,105

(22) Filed: Apr. 21, 2022

(65) Prior Publication Data

US 2022/0243919 A1 Aug. 4, 2022

Related U.S. Application Data

(62) Division of application No. 16/254,909, filed on Jan. 23, 2019, now Pat. No. 11,384,940.

(51) Int. Cl.
    *F23R 3/34* (2006.01)
    *F01D 15/10* (2006.01)
    (Continued)

(52) U.S. Cl.
    CPC .............. *F23R 3/346* (2013.01); *F01D 15/10* (2013.01); *F02C 7/228* (2013.01); *F02C 9/26* (2013.01); *F02C 9/56* (2013.01); *F23R 3/34* (2013.01)

(58) Field of Classification Search
    None
    See application file for complete search history.

(56) References Cited

U.S. PATENT DOCUMENTS

| 5,660,045 A | 8/1997 | Ito et al. |
| 5,974,781 A | 11/1999 | Correa et al. |

(Continued)

FOREIGN PATENT DOCUMENTS

| EP | 2620708 A2 | 7/2013 |
| EP | 3267107 A1 | 1/2018 |

(Continued)

OTHER PUBLICATIONS

EP Office Action issued in connection with corresponding EP Application No. 20152083.0 dated Nov. 17, 2021, 5 pages.

(Continued)

*Primary Examiner* — Jason H Duger
(74) *Attorney, Agent, or Firm* — James Pemrick; Charlotte Wilson; Hoffman Warnick LLC

(57) ABSTRACT

A loading/unloading method for a gas turbine system is disclosed. The gas turbine system includes a combustion section featuring a primary combustion stage with a first plurality of fuel nozzles and a downstream, secondary combustion stage with a second plurality of fuel nozzles. For loading, the method progresses through each of a plurality of progressive combustion modes that sequentially activate a higher number of at least one of the first or second plurality of fuel nozzles; and for unloading, the method progresses through each of a plurality of progressive combustion modes that sequentially activate a lower number of at least one of the first or second plurality of fuel nozzles. During each combustion mode, regardless of whether loading or unloading, a primary combustion stage exit temperature of a combustion gas flow is controlled to be within a predefined target range corresponding to the respective combustion mode.

14 Claims, 9 Drawing Sheets

(51) Int. Cl.
*F02C 7/228* (2006.01)
*F02C 9/26* (2006.01)
*F02C 9/56* (2006.01)

(56) References Cited

U.S. PATENT DOCUMENTS

| | | | |
|---|---|---|---|
| 6,047,550 | A | 4/2000 | Beebe |
| 6,192,688 | B1 | 2/2001 | Beebe |
| 6,779,346 | B2 | 8/2004 | Nichols |
| 6,868,676 | B1 | 3/2005 | Haynes |
| 7,822,512 | B2 * | 10/2010 | Thatcher ............... F02C 9/20 700/287 |
| 7,886,539 | B2 | 2/2011 | Cai |
| 8,387,398 | B2 | 3/2013 | Martin et al. |
| 8,683,808 | B2 | 4/2014 | Venkataraman et al. |
| 9,068,751 | B2 | 6/2015 | Snyder |
| 10,006,635 | B2 | 6/2018 | Whiteman et al. |
| 2007/0271024 | A1 | 11/2007 | Fujii et al. |
| 2008/0264033 | A1 | 10/2008 | Lacy et al. |
| 2010/0095649 | A1 * | 4/2010 | Blouch ............... F23R 3/36 60/39.463 |
| 2014/0150438 | A1 | 6/2014 | Ellis et al. |
| 2014/0157787 | A1 | 6/2014 | Bathina et al. |
| 2015/0059348 | A1 | 5/2015 | Toronto et al. |
| 2017/0058784 | A1 | 3/2017 | Vandale et al. |
| 2017/0089268 | A1 | 3/2017 | Uyama et al. |
| 2018/0010528 | A1 | 1/2018 | Bolanos-Chaverri et al. |
| 2018/0187893 | A1 | 7/2018 | DiCintio et al. |
| 2020/0232645 | A1 | 7/2020 | Cook et al. |

FOREIGN PATENT DOCUMENTS

| | | |
|---|---|---|
| EP | 3306197 A1 | 4/2018 |
| JP | 2020118158 A | 8/2020 |

OTHER PUBLICATIONS

EP Search Report and Opinion issued in connection with corresponding EP Application No. 20152083.0 dated Apr. 29, 2020, 7 pages.

Non-Final Office Action issued in connection with corresponding U.S. Appl. No. 16/254,909 dated Mar. 22, 2021, 22 pages.

Final Office Action issued in connection with corresponding U.S. Appl. No. 16/254,909 dated Dec. 21, 2021, 20 pages.

Notice of Allowance issued in connection with corresponding U.S. Appl. No. 16/254,909 dated Apr. 6, 2022, 14 pages.

* cited by examiner

GAS TURBINE LOAD/UNLOAD PATH CONTROL

This application is a Divisional application of U.S. patent application Ser. No. 16/254,909, filed on Jan. 23, 2019, now U.S. Pat. No. 11,384,940, the entire contents of which are fully incorporated here.

BACKGROUND OF THE INVENTION

The disclosure relates generally to gas turbine systems, and more particularly, to a load/unload path control process for a gas turbine system with a two stage combustion section.

Gas turbine systems are used in a wide variety of applications to generate power. In operation of a gas turbine system ("GT system"), air flows through a compressor and the compressed air is supplied to a combustion section. Specifically, the compressed air is supplied to a number of combustors each having a number of fuel nozzles, i.e., burners, which use the air in a combustion process with a fuel. The compressor includes a number of inlet guide vanes (IGVs), the angle of which can be controlled to control an air flow to the combustion section, and thus a combustion temperature. The combustion section is in flow communication with a turbine section in which the combustion gas stream's kinetic and thermal energy is converted to mechanical rotational energy. The turbine section includes a turbine that rotatably couples to and drives a rotor. The compressor may also rotatably couple to the rotor. The rotor may drive a load, like an electric generator.

The combustion section includes a number of combustors that can be used to control the load of the GT system, e.g., a plurality of circumferentially spaced combustor 'cans.' Advancements have led to the use of combustors having two combustion stages. A header (or head end) combustion stage may be positioned at an upstream end of the combustion region of each combustor. The header combustion stage includes a number of fuel nozzles that act to introduce fuel for combustion. Advanced gas turbine systems also include a second combustion stage, referred to as an axial fuel staging (AFS) or late lean injection (LLI) combustion stage, downstream from the header combustion stage in the combustion region of each combustor. The AFS combustion stage includes a number of fuel nozzles or injectors that introduce fuel diverted (split) from the header combustion stage for combustion in the AFS combustion stage. The AFS combustion stage provides increased efficiency and assists in emissions compliance for the GT system by ensuring a higher efficacy of combustion that reduces harmful emissions in an exhaust of the GT system. Each fuel nozzle in the header combustion stage can be controlled to be on or off to control flow of fuel for combustion. Conventionally, a combustion section reference temperature is used to control the combustion section. The combustion section reference temperature is an estimation of the temperature of the combustion flow at the exit of the combustion region prior to entering the turbine section.

Loading or unloading a GT system presents a number of challenges relative to controlling emissions as the GT system gradually increases or decreases its power output. For example, a start up may begin with the rotor being rotated by a motor until a speed is reached allowing the compressor to begin flowing air to the combustion section (i.e., purge speed). The speed may then be reduced at which point fuel flow is initiated to the combustion section, and fuel combustion begins. At this point, the GT system goes through a number of 'combustion modes' in which a number of fuel nozzles of the header combustion stage become operative, and then eventually all fuel nozzles in the header combustion stage and the AFS combustion stage become operative. During this process, air flow intake is set by controlling an angle of a stage(s) of IGVs on the compressor that control air flow volume.

During the progression through the combustion modes, it is very difficult to control emissions at certain times. To illustrate, FIG. 1 shows an illustrative, conventional start up load path graph plotting exhaust temperature (Tx) versus load between full speed no load (FSNL) (0% load) to 50% of rated operation, with a schematic rendition of a carbon monoxide (CO) amount in the GT exhaust in a quasi-steady state with the load path. Changes in combustion modes are shown with vertical marks on the load path line. Initially, IGVs are set to a desired angle and an initial exhaust temperature is achieved at FSNL (0% load). As startup progresses from 0% to 10% load through three illustrative combustion modes (vertical marks on load path), exhaust temperature rises as more fuel nozzles are activated and net fuel flow increases while the air flow remains constant. Exhaust temperature rises until it reaches a plateau at an isotherm exhaust temperature limit for the GT system. As shown by the CO emissions schematic rendition, as loading progresses through the combustion modes, CO amounts rise and fall through the different modes until the final combustion mode in the sequence is employed, i.e., with all fuel nozzles in header and AFS combustion stages activated. Each combustion mode typically includes at least one period during which the emissions are higher than desired at low loads. Once the final combustion mode in the sequence has been engaged, the CO emissions will eventually decrease to compliant levels as the unit loads. The lowest load at which emissions compliance is satisfied is referred to as the minimum emissions compliance load (MECL) and reflects the turndown capability of the GT system. Conventional load path control typically utilizes various control strategies for stage(s) of IGVs, inlet bleed heating, or compressor extraction flow modulation to extend a GT system's low load capability, e.g., during turndown. Using such a strategy may result in low load capability of 30%-45% of rated power depending on ambient conditions and the technology employed in the GT system.

BRIEF DESCRIPTION OF THE INVENTION

A first aspect of the disclosure provides a loading/unloading method for a gas turbine system, the gas turbine system including a compressor feeding air to a combustion section that is coupled to a turbine, the combustion system including a plurality of combustors, each combustor including a primary combustion stage including a first plurality of fuel nozzles and a secondary combustion stage downstream from the primary combustion stage, the secondary combustion stage including a second plurality of fuel nozzles, the method comprising during loading or unloading: progressing through each of a plurality of progressive combustion modes that sequentially activate a different number of at least one of the first or second plurality of fuel nozzles; and during each combustion mode regardless of whether loading or unloading, controlling a primary combustion stage exit temperature of a combustion gas flow to be within a predefined target range corresponding to the respective combustion mode.

A second aspect of the disclosure provides a gas turbine (GT) system, comprising: a compressor; a combustion section including a plurality of combustors, each combustor including a primary combustion stage including a first plurality of fuel nozzles and a secondary combustion stage downstream from the primary combustion stage, the secondary combustion stage including a second plurality of fuel nozzles; a turbine section downstream of the combustion section; a control system coupled to the combustion section and configured to, during a loading or unloading of the GT system: progress through each of a plurality of progressive combustion modes that sequentially activate a different number of at least one of the first or second plurality of fuel nozzles; and during each combustion mode regardless of whether loading or unloading, control a primary combustion stage exit temperature of a combustion gas flow to be within a predefined target range corresponding to the respective combustion mode.

A third aspect of the disclosure provides a non-transitory computer readable storage medium including code for a control system of a gas turbine system, the code configured to control a combustion section including a plurality of combustors for a gas turbine system, each combustor including a primary combustion stage including a first plurality of fuel nozzles and a secondary combustion stage downstream from the primary combustion stage, the secondary combustion stage including a second plurality of fuel nozzles, the code performing the following during loading or unloading: progressing through each of a plurality of progressive combustion modes that sequentially activate a different number of at least one of the first or second plurality of fuel nozzles; and during each combustion mode regardless of whether loading or unloading, controlling a primary combustion stage exit temperature of a combustion gas flow to be within a predefined target range corresponding to the respective combustion mode.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
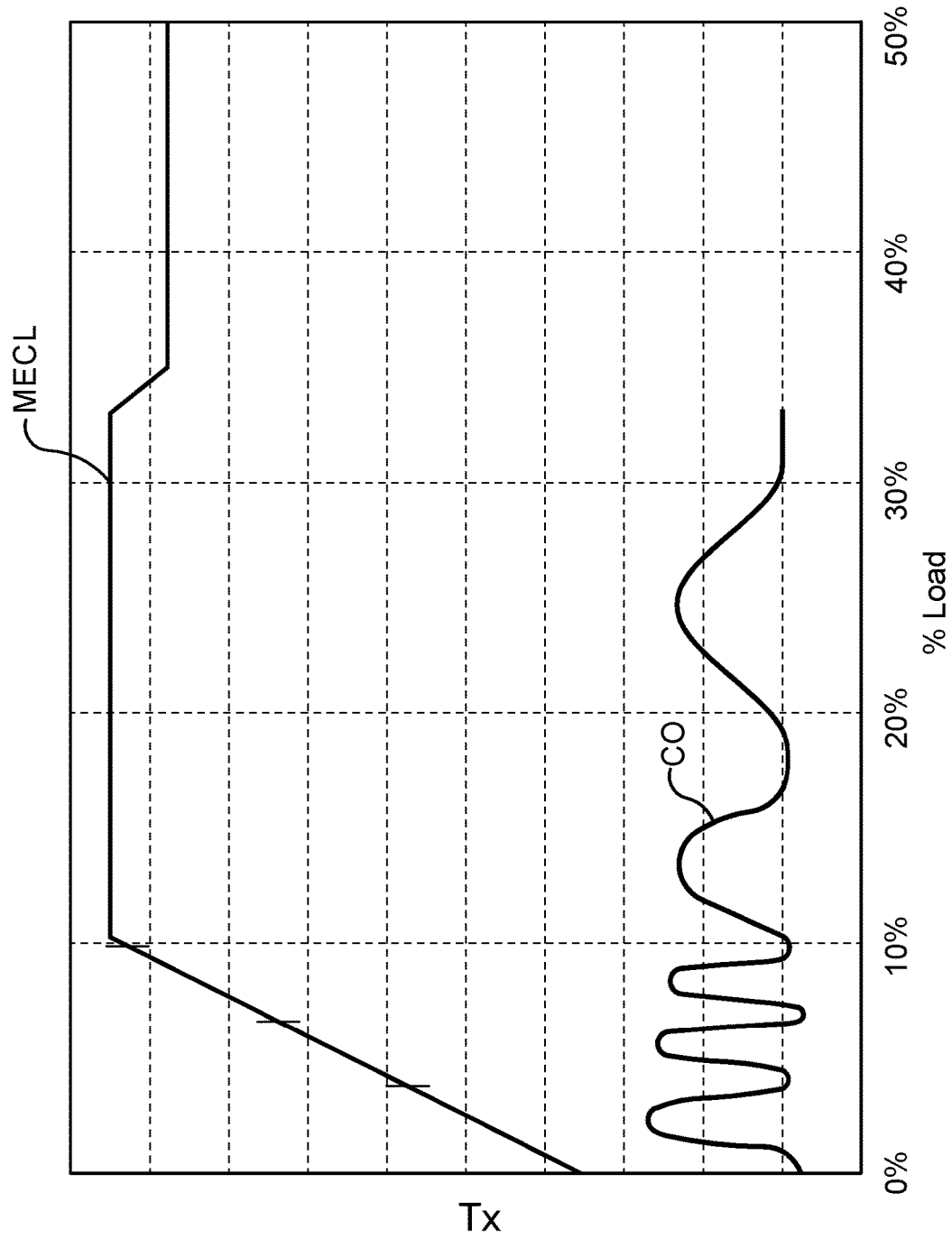
FIG. 1 shows an illustrative conventional start up load path graph plotting exhaust temperature (Tx) versus load from FSNL (0% load) up to 50%, and with a schematic rendition of a carbon monoxide (CO) emissions in the GT exhaust in a quasi-steady state adjacent the load path.

As an initial matter, in order to clearly describe the current disclosure, it will become necessary to select certain terminology when referring to and describing relevant machine components within a gas turbine (GT) system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the combustion gas stream in a combustion section or, for example, the flow of air through the compressor. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a load/unload method for a gas turbine (GT) system that may allow for emissions compliance during periods when it normally is not provided. The disclosure also includes a GT system including a compressor feeding air to a combustion section that is coupled to a turbine section. The combustion section includes a plurality of combustors with each combustor including a primary combustion stage including a first plurality of fuel nozzles and a secondary combustion stage downstream from the primary combustion stage. The secondary combustion stage includes a second plurality of fuel nozzles. Hence, the combustion section is a two stage combustion section. In accordance with embodiments of the disclosure, during loading or unloading, the method progresses through each of a plurality of progressive combustion modes that sequentially activate a different number of at least one of the first and second plurality of fuel nozzles. That is, each progressive combustion mode turns on more or less fuel nozzles to, respectively, increase or decrease the combustion temperature and combustion flow. During loading, the method progresses through each of a plurality of progressive combustion modes that sequentially activate a higher number of at least one of the first and second plurality of fuel nozzles. Similarly, during unloading, the method progresses through each of a plurality of progressive combustion modes that sequentially activate a lower number of at least one of the first and second plurality of fuel nozzles. In contrast to current load/unload methods that control a temperature at an exit of the combustor, during each combustion mode, a primary combustion stage exit temperature of a combustion gas flow (i.e., between primary and secondary combustion stages, referred to herein as primary combustion stage exit temperature (PC SET) or mid-combustor temperature) is controlled to be within a predefined target range corresponding to the respective combustion mode. As a result, emissions are better controlled to remain emissions compliant.

Figure 2:
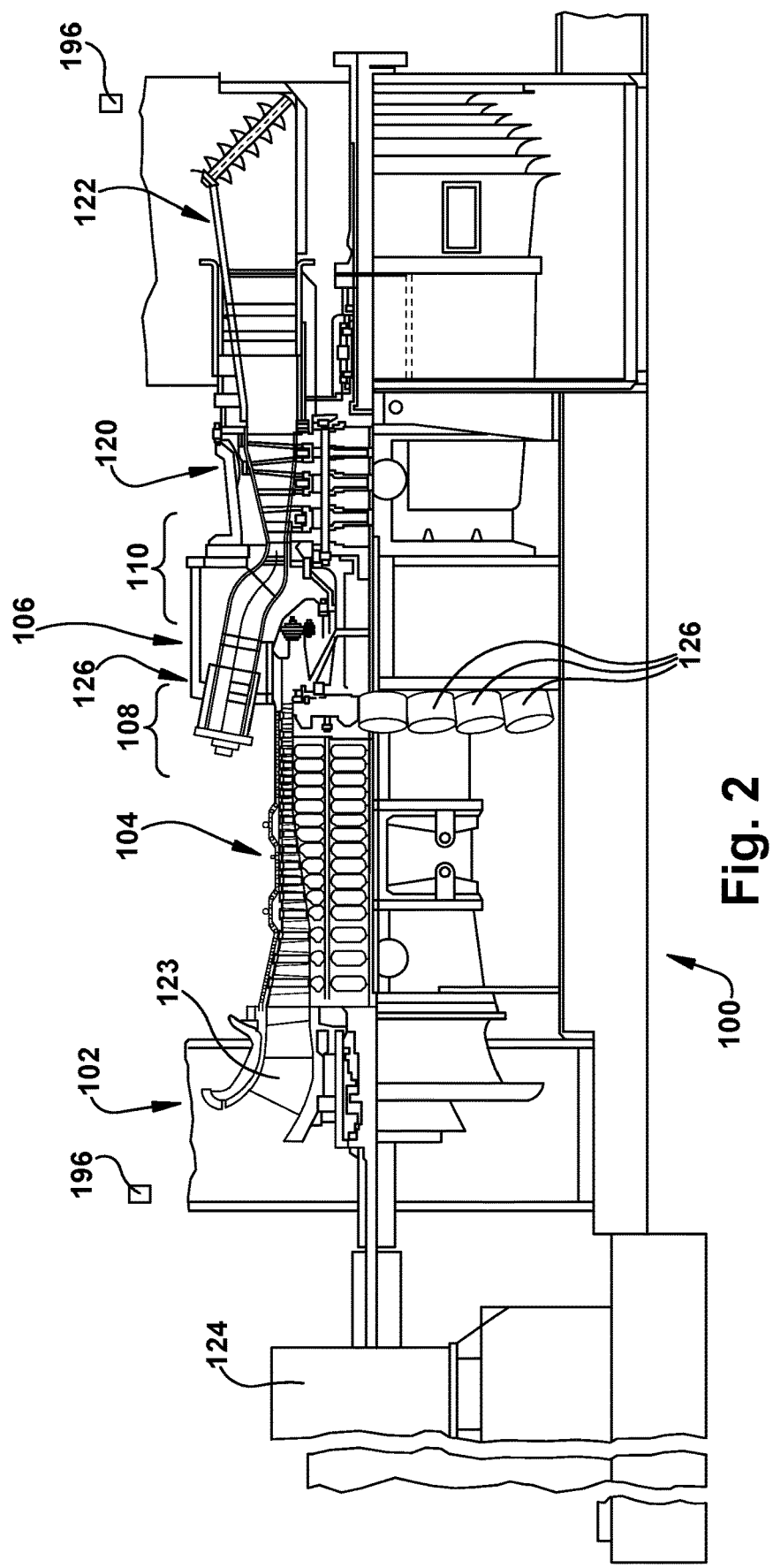
FIG. 2 shows a partial cross-sectional side view of a gas turbine system according to an embodiment of the disclosure.

FIG. 2 shows a cross-sectional view of an illustrative GT system 100 in which teachings of the disclosure may be employed. In FIG. 2, GT system 100 includes an intake section 102, and a compressor 104 downstream from intake section 102. Compressor 104 feeds air to a combustion section 106 that is coupled to a turbine section 120. Compressor 104 may include one or more stages of inlet guide vanes (IGVs) 123. As understood in the art, the angle of stages of IGVs 123 can be controlled to control an air flow volume to combustion section 106, and thus, among other things, the combustion temperature of section 106. Combustion section 106 includes a plurality of combustors 126. Each combustor 126 includes a primary combustion stage 108 including a first plurality of fuel nozzles, and a secondary combustion stage 110 downstream from primary combustion stage 108. Secondary combustion stage 110 includes a second plurality of fuel nozzles, different than the first plurality of fuel nozzles. Exhaust from turbine section 120 exits via an exhaust section 122. Turbine section 120 through a common shaft or rotor connection drives compressor 104 and a load 124. Load 124 may be any one of an electrical generator and a mechanical drive application and may be located forward of intake section 102 (as shown) or aft of exhaust section 122. Examples of such mechanical drive applications include a compressor for use in oil fields and/or a compressor for use in refrigeration. When used in oil fields, the application may be a gas reinjection service. When used in refrigeration, the application may be in liquid natural gas (LNG) plants. Yet another load 124 may be a propeller as may be found in turbojet engines, turbofan engines and turboprop engines.

Figure 3:
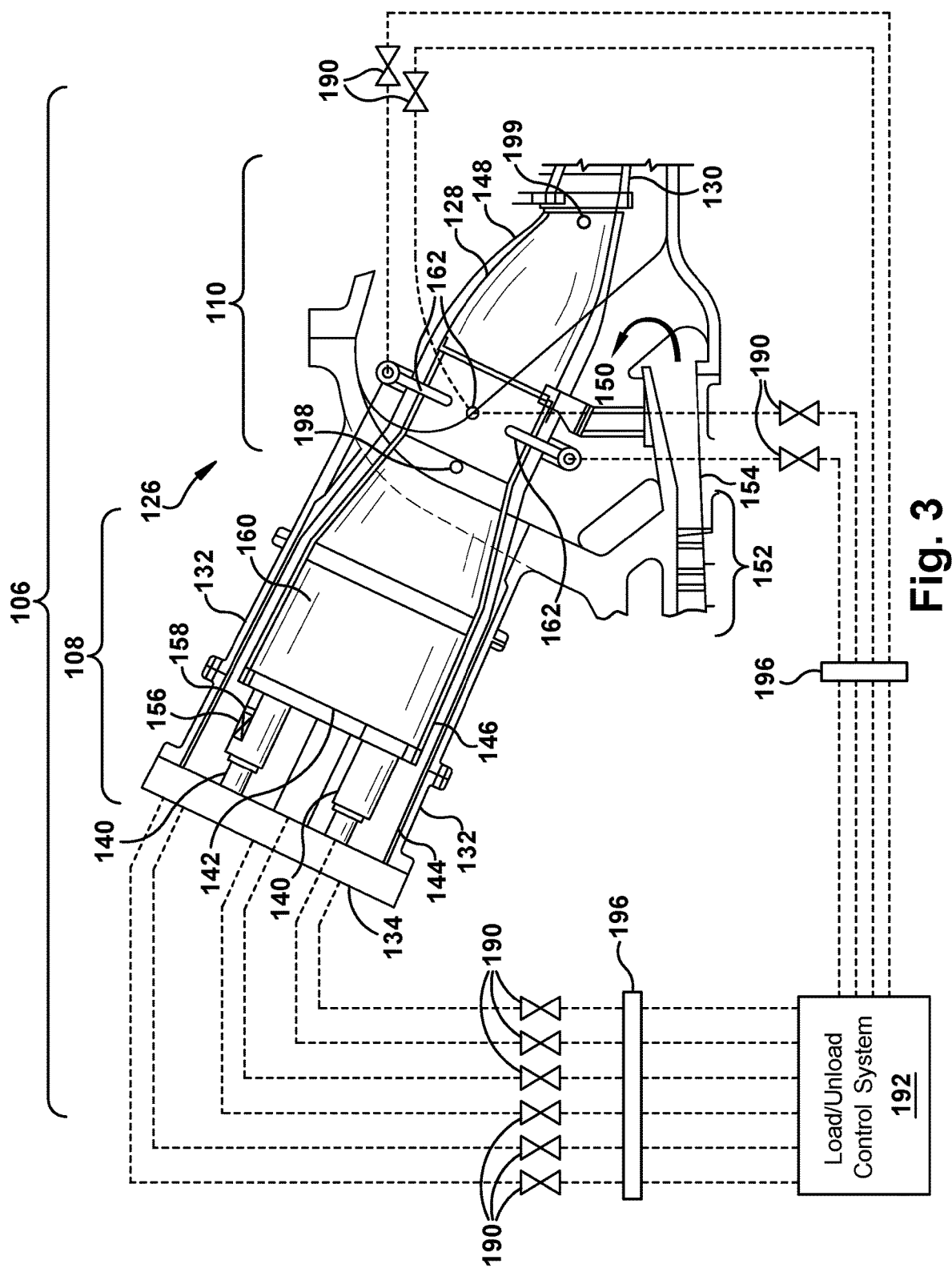
FIG. 3 shows a cross-sectional side view of a combustor for a combustion section useable in GT system of FIG. 2.

Referring to FIGS. 2 and 3, combustion section 106 may include a circular array of a plurality of circumferentially spaced combustors 126. FIG. 3 shows a cross-sectional side view of combustor 126. A fuel/air mixture is burned in each combustor 126 to produce the hot energetic combustion gas flow, which flows through a transition piece 128 (FIG. 3) to turbine nozzles 130 (FIG. 3) of turbine section 120. For purposes of the present description, only one combustor 126 is illustrated, it being appreciated that all of the other combustors 126 arranged about combustion section 106 are substantially identical to the illustrated combustor 126. Although FIG. 2 shows a plurality of circumferentially spaced combustors 126 and FIG. 3 shows a cross sectional side view of a combustor 126 that have come to be known in the art as can combustor systems, it is contemplated that the present disclosure may be used in conjunction with other combustor systems including and not limited to annular combustor systems.

Referring now to FIG. 3, there is shown generally a combustor 126 for GT system 100 (FIG. 2) including primary combustion stage 108 and secondary combustion stage 110. A transition piece 128 flows hot combustion gas flow to turbine nozzles 130 and the turbine blades (not shown). Primary combustion stage 108 may include a casing 132, an end cover 134, a first plurality of premixing fuel nozzles 140 (hereinafter simply "fuel nozzles 140"), a cap assembly 142, a flow sleeve 144, and a combustion liner 146 within flow sleeve 144. An ignition device (not shown) is provided and preferably comprises an electrically energized spark plug. Combustion in primary combustion section 108 occurs within combustion liner 146. Combustion air is directed within combustion liner 146 via flow sleeve 144 and may enter combustion liner 146 through a plurality of openings formed in cap assembly 142. The air enters combustion liner 146 under a pressure differential and mixes with fuel from start-up fuel nozzles (not shown) and/or first plurality of fuel nozzles 140 within combustion liner 146. Consequently, a combustion reaction occurs within combustion liner 146 releasing heat for the purpose of driving turbine section 120 (FIG. 2). High-pressure air for primary combustion stage 108 may enter flow sleeve 144 and a transition piece impingement sleeve 148, from an annular plenum 150. Compressor 104 (FIG. 2), which is represented by a series of vanes and blades at 152 and a diffuser 154 in FIG. 3, supplies this high-pressure air.

Each of first plurality of fuel nozzles 140 in primary combustion stage 108 can take a variety of forms. In the example of FIG. 3, each fuel nozzle 140 may include a swirler 156, consisting of a plurality of swirl vanes that impart rotation to the entering air and a plurality of fuel spokes 158 that distribute fuel in the rotating air stream. The fuel and air then mix in an annular passage within fuel nozzle 140 before reacting within primary reaction zone 160. However, other forms of (premixing) fuel nozzles 140 may be employed.

As shown in FIG. 3, secondary combustion stage 110 includes a second plurality of fuel nozzles 162 for transversely injecting a secondary fuel mixture into a combustion gas flow product of primary combustion stage 108. Fuel nozzles 162 may include any variety and number of injection elements for injecting the second fuel mixture. Fuel nozzles 162 may extend radially into the combustion gas flow path. In one example, four circumferentially spaced fuel nozzles 162 are employed. However, any number may be possible.

Figure 4:
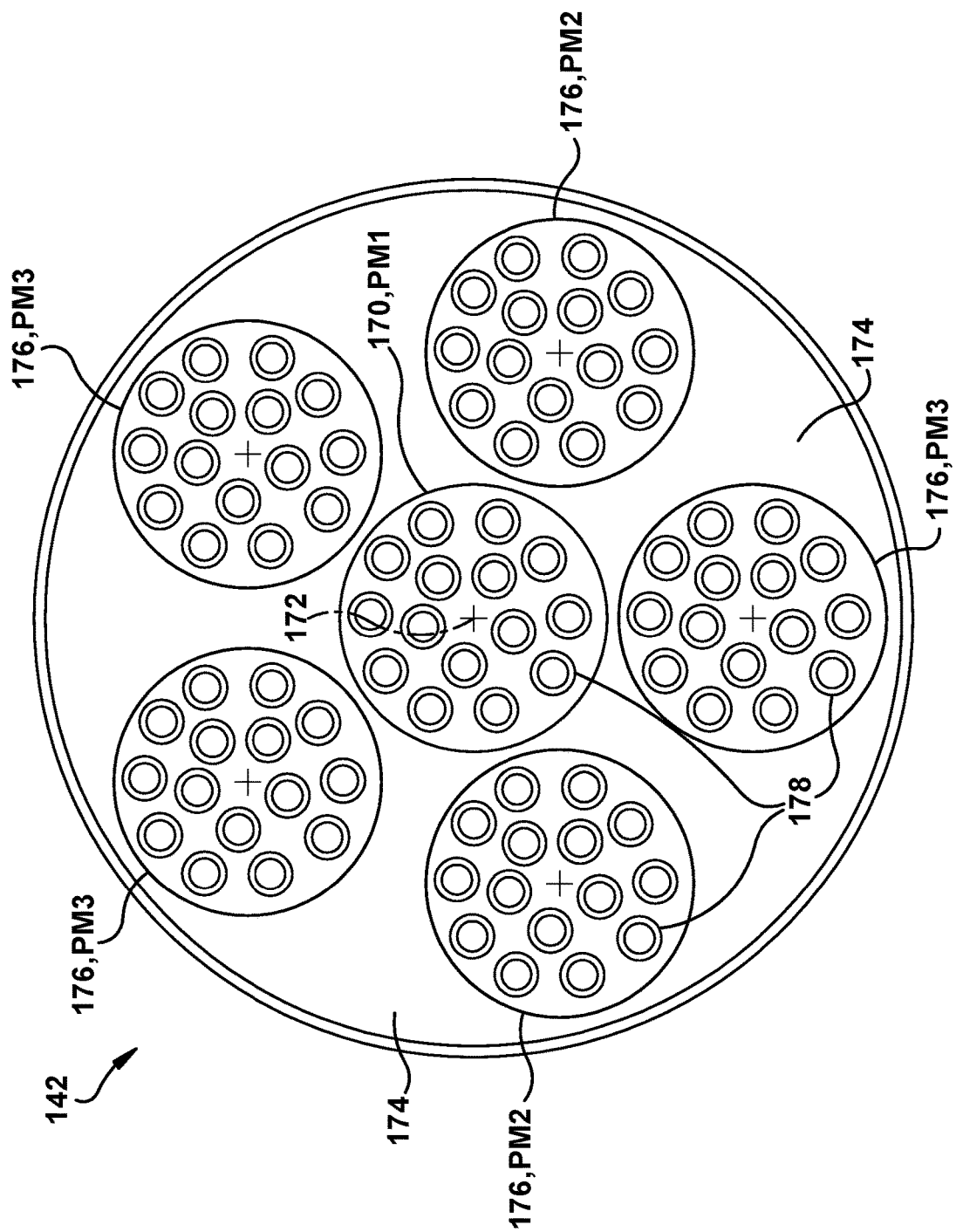
FIG. 4 shows a plan view of a cap assembly of the combustor of FIG. 3, as viewed from the aft end of the combustor looking upstream, according to a first aspect herein.
Figure 5:
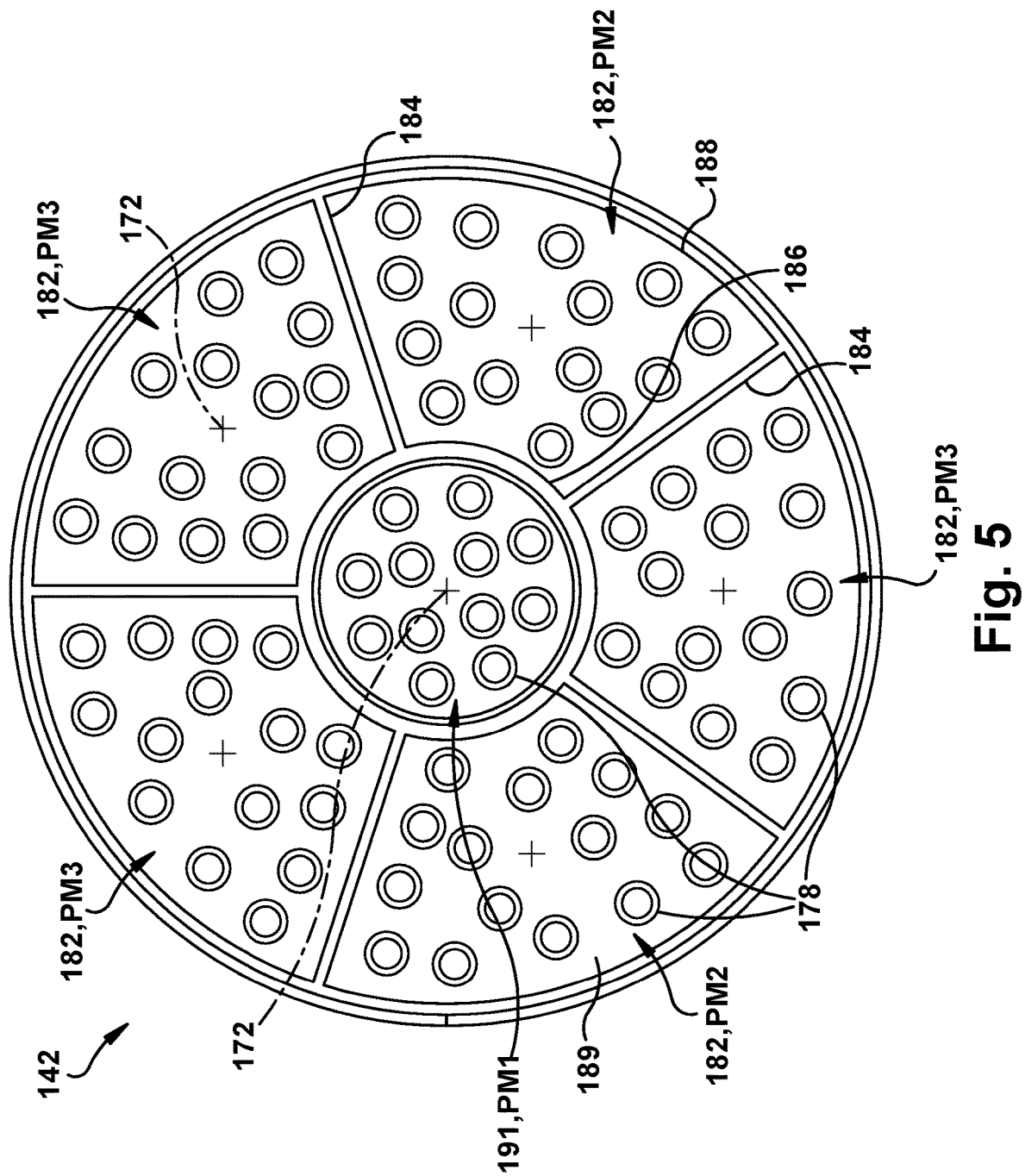
FIG. 5 shows a plan view of an alternate cap assembly of the combustor of FIG. 3, as viewed from the aft end of the combustor looking upstream, according to a second aspect herein.

With further regard to first plurality of fuel nozzles 140 in FIG. 3, fuel nozzles 140 may also have a variety of layouts, e.g., relative to cap assembly 142. FIGS. 4 and 5 are plan views of alternate embodiments of a combustor cap assembly 142, as viewed from an aft end of combustion section 106 looking in an upstream direction. Cap assembly 142 illustrated in FIG. 3 corresponds to that shown in more detail in FIG. 4, although it should be understood that cap assembly 142 illustrated in FIG. 5 is equally well-suited for combustion section 106 shown in FIG. 3.

In FIG. 4, a center fuel nozzle 170, which is disposed about a centerline 172 of combustion section 106, is secured within a respective opening (not separately labeled) in a cap plate 174. A plurality (in this example, five) outer fuel nozzles 176 are disposed about center fuel nozzle 170 and likewise are secured within respective openings in cap plate 174. Each outer fuel nozzle 176 has a centerline 172. Each fuel nozzle 170, 176 is a bundled tube fuel nozzle having a plurality of parallel, non-concentric mixing tubes 178 that extend through a common fuel plenum. Cap plate 174 may include a plurality of cooling holes to facilitate cooling of the cap face, and/or cap assembly 142 may include a second plate upstream of cap plate 174 to direct cooling flow against the upstream surface of cap plate 174.

In FIG. 5, a center fuel nozzle 180 is surrounded by a plurality (in this case, five) outer fuel nozzles 182. Each outer fuel nozzle 182 has a truncated wedge shape, such that outer fuel nozzles 182 may be positioned in close proximity to center fuel nozzle 180 and cover a majority of the head end area. The truncated wedge shape may be defined as having a pair of radial sides 184 that extend in opposite directions and that are joined by a first (radially inner) arcuate side 186 and a second (radially outer) arcuate side 188. Radially outer sides 188 define a radially outer perimeter of fuel nozzles 182 and, collectively, of cap assembly 142. Each fuel nozzle 182 has a respective centerline 172 radially outward of centerline 172 of center fuel nozzle 180 and combustion section 106. In this illustrative configuration, each fuel nozzle 180, 182 may have its own respective nozzle face 189 in a shape corresponding to the shape of outer fuel nozzle 182 (wedge) or 180 (round). Alternatively, tubes 178 that are part of each respective fuel nozzle 180, 182 may extend through a common cap plate (not shown). In this configuration, outer fuel nozzles 182 have respective fuel plenums defining a wedge shape, and center fuel nozzle 180 has a fuel plenum defining a round shape. The upstream ends of mixing tubes 178 of each fuel nozzle 180, 182 extend through a respective fuel plenum for each fuel nozzle 180, 182. It should be noted that the specific size, spacing, and number of mixing tubes 178 shown in the Figures (including FIGS. 4 and 5) is intended to be representative of the present bundled tube fuel nozzles 170, 176, 180, 182 and should not be construed as limiting the present bundled tube fuel nozzles as having tubes of any particular size, spacing, or number. Moreover, it should be not construed as limiting the present bundled tube fuel nozzles as having tubes with a single tube diameter.

In FIGS. 4 and 5, fuel nozzles 170, 176, 180, 182 are each denoted with an alphanumerical "PM" indicator, e.g., PM1, PM2 or PM3. As will be described elsewhere herein, these indicators are used to indicate which fuel nozzles are activated or operational, i.e., burning fuel, during a particular 'combustion mode.' While primary combustion stage 108 is shown as including six fuel nozzles 170, 176, 180, 182 (FIGS. 4-5), and secondary combustion stage 110 is shown as including four fuel nozzles 162 (FIG. 3), it is emphasized that the teachings of the disclosure are not limited to stages with any particular number of fuel nozzles. Further, while certain types of fuel nozzles 140, 162 have been described herein, it is emphasized that a wide variety of fuel delivery elements can be employed.

As understood in the art, a plurality of sensors 196 detect various operating conditions of GT system 100, and/or the ambient environment during operation of the system. In many instances, multiple redundant control sensors may measure the same operating condition. For example, groups of redundant temperature control sensors 196 may monitor ambient temperature, compressor discharge temperature, turbomachine exhaust gas temperature, and/or other operating temperatures of combustion gas flow (not shown) through GT system 100. Similarly, groups of other redundant pressure control sensors 196 may monitor ambient pressure, static and dynamic pressure levels at compressor 104, GT system 100 exhaust, and/or other parameters in GT system 100. Control sensors 196 may include, without limitation, flow sensors, pressure sensors, speed sensors, flame detector sensors, valve position sensors, guide vane angle sensors, and/or any other device that may be used to sense various operating parameters during operation of GT system 100.

It is further recognized that while some parameters are measured, i.e., are sensed and are directly known, other parameters are calculated by a model and are thus estimated and indirectly known. Some parameters may also be initially input by a user 210 (FIG. 6) to GT control system 194. In terms of the modeled parameters and applicable to the present disclosure, a primary combustion stage exit temperature (PCSET) of a combustion gas flow 108 (i.e., located conceptually between primary combustion stage 108 and secondary combustion stage 110 at location 198 in FIG. 3) may be calculated using a model of GT system 100. Similarly, a combustor exit temperature, i.e., conceptually at the end of transition piece 128 at location 199 in FIG. 3, may be calculated using a model of GT system 100. Historically, measured cycle parameters including but not limited to compressor pressure ratio (CPR), compressor discharge temperature (TCD), exhaust temperature (Tx), and GT output power have been used as modeling inputs to predict combustion exit temperatures from combustion section 106. In accordance with embodiments of the disclosure, PCSET of a combustion gas flow will be controlled within a combustion mode(s) during loading and/or unloading of GT system 100 to control emissions.

Figure 6:
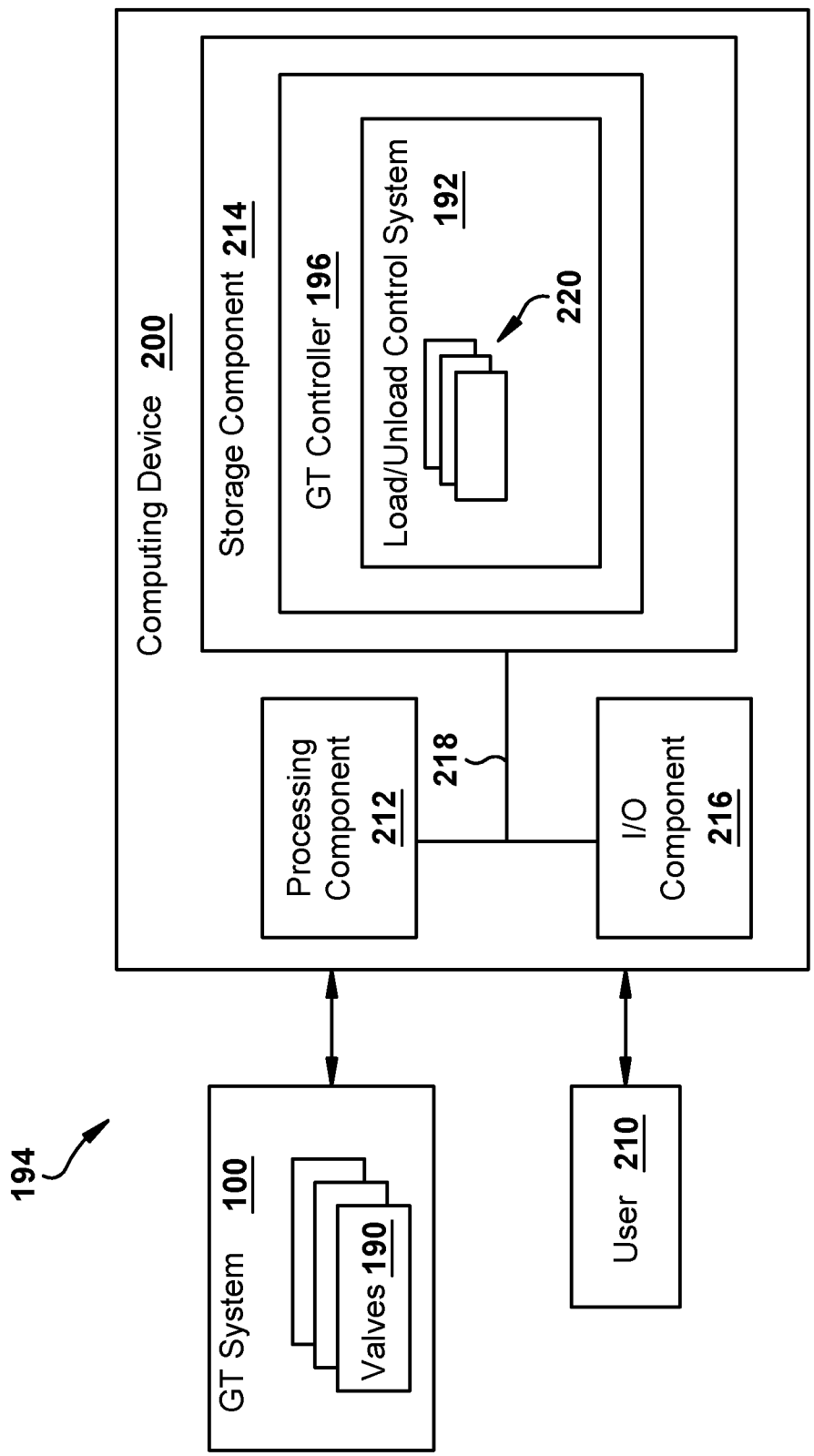
FIG. 6 shows an illustrative environment including a GT controller and a load/unload control system, according to various embodiments of the invention.

A load/unload control system 192 regulates an amount of fuel flow from a fuel supply(ies) (not shown) to combustion section 106, and in particular, to each of fuel nozzles 140 (FIG. 3) (170, 176, 180, 182 (FIGS. 4-5), hereinafter simply "fuel nozzles 140" for brevity) and/or fuel nozzles 162 (FIG. 3) by controlling fuel valves 190. Each fuel valve 190 is not limited to a single type of valve and may include a variety of types including but not limited to fuel control valves and fuel stop valves. Load/unload control system 192 can also control an amount of fuel split between primary combustion stage fuel nozzles 140 and secondary combustion stage fuel nozzles 162, and an amount mixed with air flowing into combustion section 106. Load/unload control system 192 may also control a split of fuel between combustion stages 108 and 110. Although not always applicable, load/unload control system 192 may also select a type of fuel for use in combustion section 106. Load/unload control system 192 may be a separate unit or may be a component of an overall GT control system 194 (FIG. 6), e.g., as part of GT controller 196 (FIG. 6). Load/unload control system 192 can implement a method according to embodiments of the disclosure, as will be described further herein.

FIG. 6 shows an illustrative environment demonstrating load/unload control system 192 coupled with GT system 100 (FIG. 1) via at least one computing device 200. Load/unload control system 192 may be a computer system (computing device 200, FIG. 6) that includes at least one processor (processing component 202, FIG. 6) and at least one memory device (storage component 214, FIG. 6) that executes operations to control the operation of GT system 100 based at least partially on models, sensor inputs, calculations and/or on instructions from human operators. Load/unload control system 192 may include, for example, a model of GT system 100. Operations executed by load/unload control system 192 may include sensing or modeling operating parameters, modeling operational boundaries, applying operational boundary models, or applying scheduling algorithms that control operation of GT system 100, such as by regulating a fuel flow to combustion section 106. Load/unload control system 192 compares operating parameters of GT system 100 to operational boundary models, or scheduling algorithms used by load/unload control system 192 to generate control outputs, such as, without limitation, control instructions for valves 190 controlling activation of fuel nozzles 140 (FIG. 3) and/or fuel nozzles 162 (FIG. 3) based on PCSET of a combustion gas flow of primary combustion stage 108. For example, the model may accept measured parameters as inputs such as compressor air discharge temperature (TCD), fuel flow(s), exhaust temperature (Tx), GT system output power, etc., and calculate PCSET of the combustion gas flow after primary combustion stage 108 along with other parameters used in the control such as but not limited to: firing temperature (Tfire) and combustor exit temperature (at location 199 (FIG. 3)). Commands generated by load/unload control system 192 may cause valve(s) 190 on GT system 100 to selectively regulate fuel flow, fuel splits, and/or a type of fuel channeled between the fuel supply(ies) and combustors 106. Other commands may be generated to cause actuators to adjust a relative position of stages of IGVs 123 (FIG. 2) or activate other control settings on GT system 100.

Figure 7:
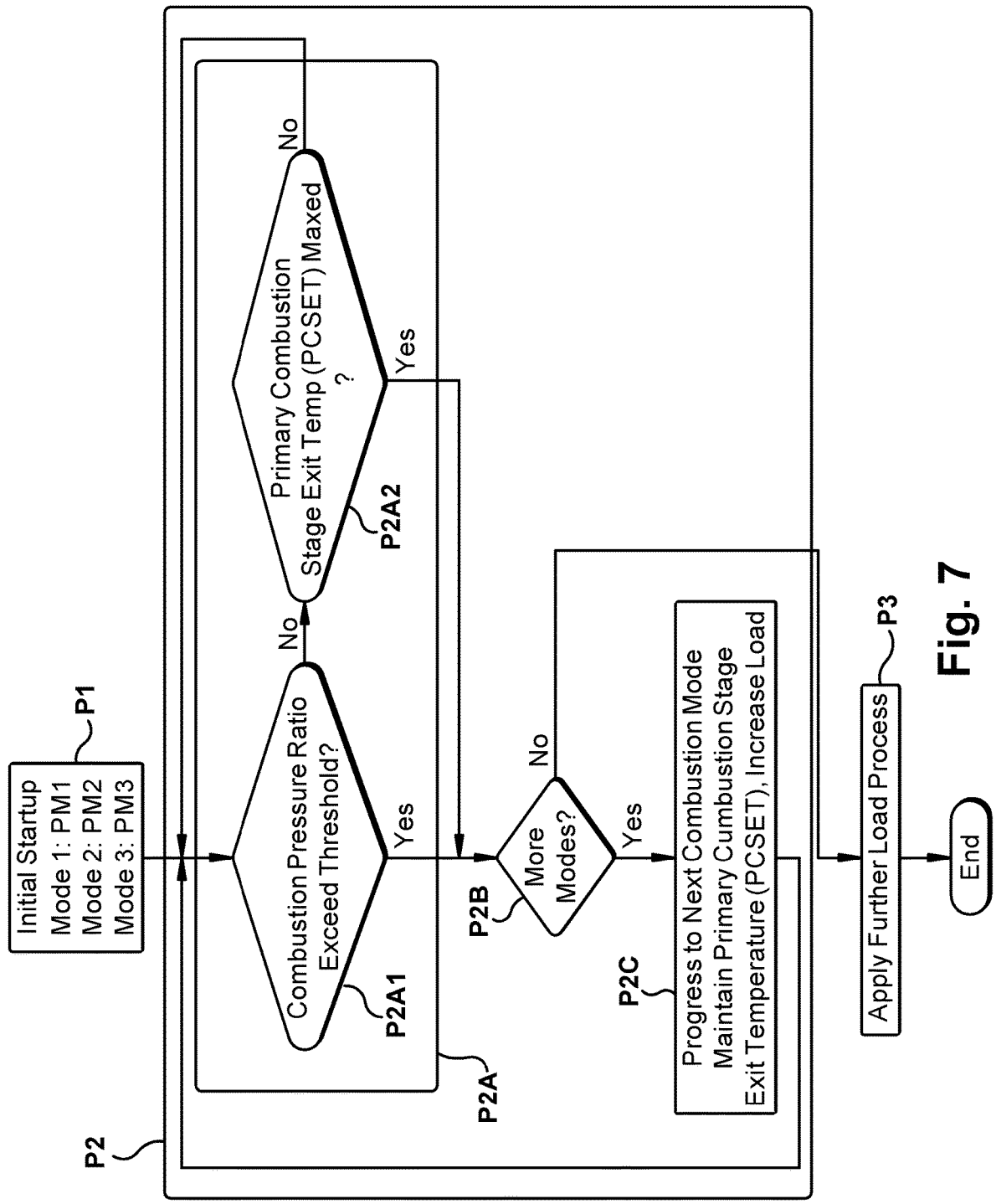
FIG. 7 shows a flow diagram of an illustrative loading method according to embodiments of the disclosure.
Figure 8:
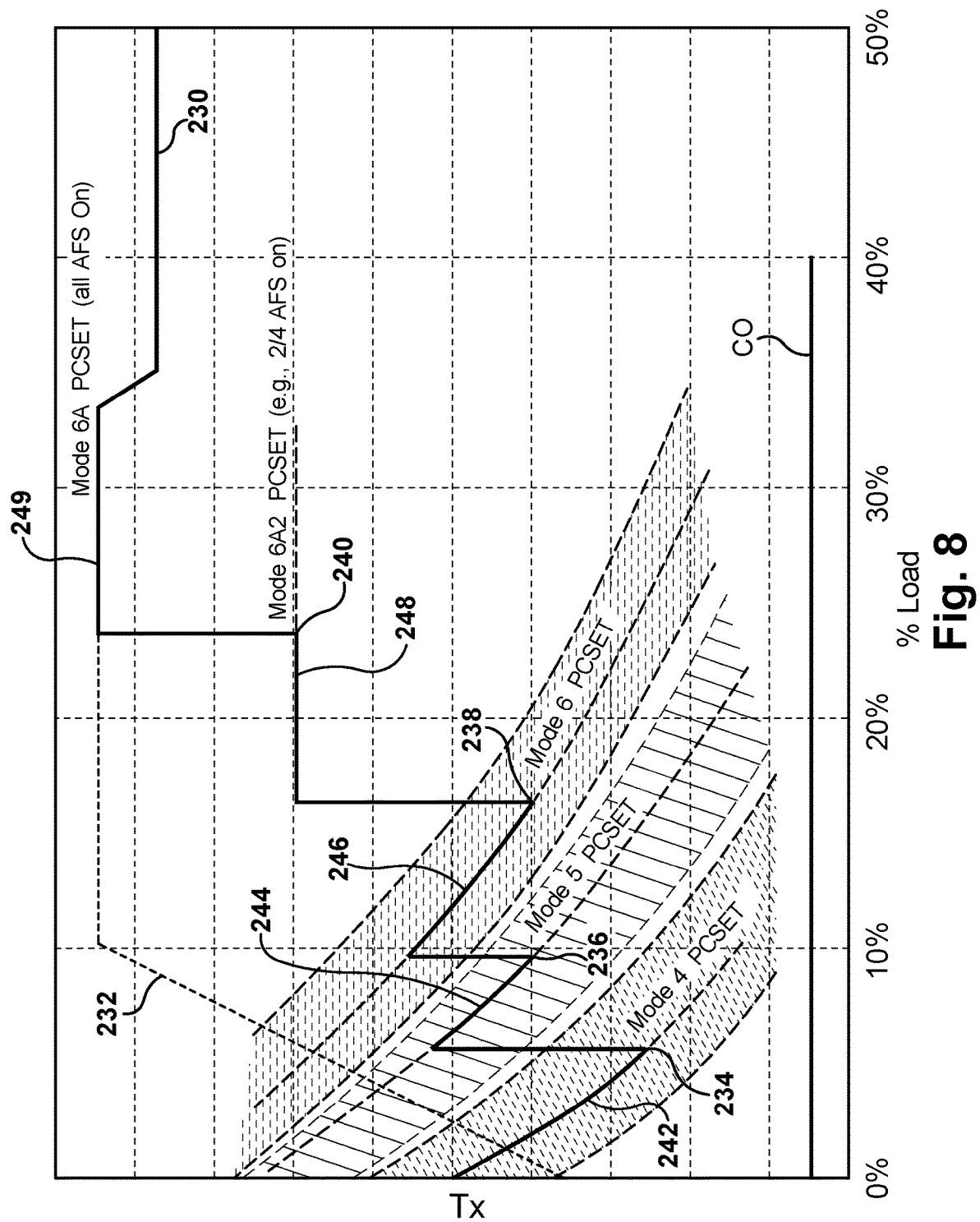
FIG. 8 shows an emission compliant start up load path graph plotting exhaust temperature (Tx) versus load from FSNL (0% load) up to 50%, and with a schematic rendition of a carbon monoxide (CO) emissions in the GT exhaust in a quasi-steady state with the load path, according to embodiments of the disclosure.

FIG. 7 shows a flow diagram illustrating a load/unload method for GT system 100, which can be performed by a computing device such as load/unload control system 192. More specifically, the FIG. 7 example shows a loading setting such as a start up of GT system 100. FIG. 8 shows an emission compliant start up (loading) load path graph plotting exhaust temperature (Tx) versus load from FSNL (0% load) up to 50%, according to embodiments of the disclosure. FIG. 8 also includes a schematic rendition of a carbon monoxide (CO) amount in the GT exhaust in a quasi-steady state with the load path.

With reference to FIGS. 2 and 6-8, a load/unload method can be performed (e.g., executed) using at least one computing device 200, implemented as a computer program product (e.g., a non-transitory computer program product) for load/unload control system 192. Generally, the process includes progressing through each of a plurality of progressive combustion modes that sequentially activate a different number of at least one of the first or second plurality of fuel nozzles, while controlling PCSET of a combustion gas flow to be constant or within a predefined target range corresponding to the respective combustion mode. For example, for loading, the process includes progressing through each of a plurality of progressive combustion modes that sequentially activate a higher number of at least one of the first or second plurality of fuel nozzles, while controlling a PCSET of a combustion gas flow of the primary combustion stage 108 to be within a predefined target range corresponding to the respective combustion mode. As used herein, a "combustion mode" is a state in which a certain number of fuel nozzles in primary combustion stage 108, or primary combustion stage 108 and secondary combustion stage 110 are activated or operational, i.e., they are burning fuel. Each combustion mode may also include a number of other operational parameter settings for GT system 100 such as but not limited to: IGV stage 123 (FIG. 2) positioning to control air flow to combustion system 106.

As shown in FIG. 7, in process P1, an initial start up process may be performed. The initial start up may include processing according to embodiments of the disclosure in which PC SET of a combustion gas flow is maintained within a predefined target range corresponding to the respective combustion mode, or process P1 can be conventional, i.e., with no PCSET control. For example, a start up may begin with the rotor being rotated by a motor at a speed to prevent bowing of the rotor (i.e., turning gear speed) and then increasing to a speed that allows compressor 102 (FIG. 2) to begin flowing air to combustion section 106 (i.e., purge speed). The speed may then be reduced at which point fuel flow is initiated to combustion section 106, i.e., load/unload control system 192 initiates fuel flow via valve(s) 190, and fuel combustion begins. At this point, GT system 100 may go through a number of 'combustion modes' in which a typically increasing number of fuel nozzles 170, 176, 180, 182 (FIGS. 4-5) of primary combustion stage 108 are activated. In the example shown, combustion modes 1, 2 and 3 are implemented apart from the teachings of the disclosure. For example, with reference to FIG. 4 or 5: a combustion mode 1 may activate fuel nozzle denoted PM1; a combustion mode 2 may activate fuel nozzles denoted PM2; and a combustion mode 3 may activate fuel nozzles denoted PM1 and PM2 (center and 2 outer) in primary combustion stage 108. No secondary combustion stage fuel nozzles 162 are activated in secondary combustion stage 110 at this time. It is emphasized that process P1, as described, is only illustrative and any now known or later developed initial start up process can be employed prior to implementing the teachings of the disclosure.

In process P2, each of a plurality of progressive combustion modes that sequentially activate a different number of at least one of the first or second plurality of fuel nozzles are progressed through, while also controlling PCSET to be within a predefined target range corresponding to the respective combustion mode. For loading, as shown in FIG. 8, each of the plurality of progressive combustion modes sequentially activate a higher number of at least one of the first or second plurality of fuel nozzles. Throughout process P2, fuel flow and load output of GT system 100 are increasing.

FIG. 8 shows a load path 230 (darker, solid line) according to embodiments of the disclosure that illustrates the progressive combustion modes and controlling PCSET of a combustion gas flow. As will be described, some of the progressive combustion modes may have a different predefined target range for PCSET, e.g., a predefined target range for PCSET for combustion mode M6 is higher than combustion mode 5, and predefined target range for PC SET for combustion mode 5 is higher than combustion mode 4. However, a predefined target range for other combustion modes, e.g., modes 6, 6A2 and 6A, as will be described, may be the same. Certain combustion modes may have a larger or smaller predefined target range than other combustion modes. It will be appreciated that the predefined target range for PCSET for each combustion mode is influenced by a number of factors such as but not limited to: GT system size, location/environment; government regulations; fuel used; or other settings. Consequently, exact statements of value for each predefined target range may vary widely. "Predefined" as applied to the predefined target range simply indicates that load/unload control system 192 calculates the acceptable range prior to implementation thereof, e.g., based on the above noted factors and the particular combustion mode. FIG. 8 also shows conventional load path 232 (shown in dashed line) for comparison purposes. In FIG. 8, an illustrative next combustion mode upon which teachings of the disclosure may be applied, i.e., after process P1, may be combustion mode 4. It is noted that another combustion mode could also be the point in which the teachings of the disclosure are applied, e.g., combustion mode 3 or 5.

In process P2A, load/unload control system 192 can determine whether to progress to a next combustion mode in a number of ways. In one embodiment, progressing to a next successive combustion mode of the plurality of combustion modes occurs in response to one of the following: in process P2A1, a compressor pressure ratio of compressor 104 exceeds a respective threshold for a current combustion mode; or, in process P2A2, PC SET exceeds a respective maximum threshold for the current combustion mode. Here, each combustion mode may have a pre-assigned compressor pressure ratio (CPR) threshold, and a maximum PC SET threshold. When either threshold is exceeded, i.e., directly exceeded or within an unacceptable range, load/unload control system 192 activates more fuel nozzles to move GT system 100 along load path 230 to the next combustion mode, if more combustion modes exist. At process P2B, load/unload control system 192 determines whether any additional combustion modes exist. If there are additional combustion modes, i.e., Yes at process P2B, processing proceeds to process P2C. If not, i.e., No at process P2B, processing proceeds to process P3, described elsewhere herein. In the current pass, additional combustion modes exist, and processing proceeds to process P2C.

At process P2C in FIG. 7, load/unload control system 192 may implement a next combustion mode (e.g., combustion mode 4) by activating fuel nozzles denoted PM1 and PM3 (center and 3 outer)(FIG. 4-5) in primary combustion stage 108. Line 242 in FIG. 8 reflects a constant PCSET value as well as the combustion mode 4 PCSET control target. The shaded band shows a predefined target range of PCSET that is emissions compliant for combustion mode 4, and in which PCSET may vary. As noted, an amount PCSET may vary will depend on a number of factors such as but not limited to: GT system size, location/environment; government regulations; fuel used; or other settings. PCSET may be maintained during combustion mode 4, at process P2C in FIG. 7, by load/unload control system 192 in any now known or later developed fashion. For example, load/unload control system 192 may control at least one of: a fuel flow rate (e.g., via valves 190) of each fuel nozzle activated during a respective combustion mode; or a position of at least one stage of IGVs 123 (FIG. 2) that control an air flow volume to combustion section 106 from compressor 104. In the example shown in FIG. 8, the position of stages of IGVs 123 is used to regulate PCSET for operation in combustion mode 4. Maintaining PCSET within a predefined target range suitable for combustion mode 4 results in better emissions control during the loading process shown, see fairly consistent, quasi-steady state CO emissions in FIG. 8.

Subsequently, processing returns to process P2A (after process P2C), where load/unload control system 192 again determines whether to progress to a next combustion mode. For example, in response to one of the following: in process P2A1, a compressor pressure ratio of compressor 104 exceeding a respective threshold for a current combustion mode; or, in process P2A2, a PCSET may exceed a respective maximum threshold for the current combustion mode. If one of the thresholds is exceeded, processing progresses to process P2B. At process P2B, load/unload control system 192 determines whether any additional combustion modes exist. If there are additional combustion modes, i.e., Yes at process P2B, processing proceeds to process P2C. If not, i.e., No at process P2B, processing proceeds to process P3, described elsewhere herein.

Returning to FIG. 8, point 234 indicates when combustion mode 5 is implemented at process P2C of FIG. 7 by load/unload control system 192. Load/unload control system 192 may activate more fuel nozzles in primary combustion stage 108 such as fuel nozzles denoted PM2 and PM3 (4 outer) (FIGS. 4 and 5) to implement combustion mode 5. Additionally, PCSET target used by load/unload control system 192 is updated to an appropriate level for combustion mode 5. In the example shown in FIG. 8, the PCSET predefined target range, and thus exhaust temperature Tx, increases to a higher level, shown by line 244. The shaded band shows a range of PCSET that is emissions compliant for combustion mode 5, and in which PCSET may vary based on the afore-described factors. PCSET may be maintained during combustion mode 5, at process P2C in FIG. 7, by load/unload control system 192 in any now known or later developed fashion, e.g., by controlling at least one of: a fuel flow rate of each fuel nozzle activated during a respective combustion mode, or a position of at least one stage of IGVs 123 (FIG. 2) that control an air flow volume to combustion section 106 from compressor 104. In the example shown in FIG. 8, the position of the IGVs 123 may be used to regulate PCSET for operation in combustion mode 5. Maintaining PCSET within a predefined target range suitable for combustion mode 5 results in better emissions control during the loading process shown, as illustrated by the quasi-steady state CO emissions line.

Returning to FIG. 7, in process P2A (after process P2C), load/unload control system 192 can determine whether to progress to a next combustion mode, assuming one exists (process P2B).

Returning to FIG. 8, point 236 indicates when combustion mode 6 is implemented at process P2C of FIG. 7 by load/unload control system 192. Load/unload control system 192 may again activate more fuel nozzles in primary combustion stage 108 such as fuel nozzles denoted PM1, PM2 and PM3 (FIGS. 4-5) (all primary stage fuel nozzles) to implement combustion mode 6. Additionally, PCSET target used by load/unload control system 192 is updated to an appropriate level for combustion mode 6. In the example shown in FIG. 8, PCSET target, and thus exhaust temperature Tx, increase to a higher level. Line 246 reflects a constant PCSET value as well as the combustion mode 6 PCSET control target. The shaded band shows a predefined target range for combustion mode 6 in which PCSET may vary. Again, PCSET may be maintained during combustion mode 6, at process P2C in FIG. 7, by load/unload control system 192, e.g., by controlling at least one of: a fuel flow rate of each fuel nozzle activated during a respective combustion mode; and a position of at least one stage of IGVs 123 (FIG. 2) that control an air flow volume to combustion section 106 from compressor 104. In the example shown in FIG. 8, the position of stage(s) of IGVs 123 is used to regulate PCSET for operation in mode 6. Maintaining PCSET within a predefined target range suitable for combustion mode 6 results in better emissions control during the loading process shown.

The above-identified process can repeat as before with the notable exception now that once combustion mode 6 (all fuel nozzles in primary combustion stage 108 are active), load/unload control system 192 may start to activate fuel nozzles 162 in secondary combustion stage 110. For example, a seventh combustion mode, referred to as 6A2 in FIG. 8, may have load/unload control system 192 activate fuel nozzles denoted PM1, PM2 and PM3 (FIGS. 4-5) in primary combustion stage 108 (all primary stage fuel nozzles) and also at least one of the second plurality of fuel nozzles 162 (FIG. 3) of secondary combustion stage 110. In one example, half of fuel nozzles 162 may be activated, e.g., 2 of 4. The transition may occur, after process P2A (FIG. 7), i.e., in response to load/unload control system 192 determining whether to progress to a next combustion mode, assuming one exists. The transition point is indicated with numeral 238 in FIG. 8. Again, PCSET may be maintained during combustion mode 6A2, at process P2C in FIG. 7, by load/unload control system 192—see line 248. During any combustion mode in which all of the first plurality of fuel nozzles 140 (FIG. 3) of primary combustion stage 108 and the at least one of the second plurality of fuel nozzles 162 (FIG. 3) of secondary combustion stage 110 are active, load/unload control system 192 may also modify a split of fuel flow between the primary and secondary combustion stages 108, 110 to decrease a fuel flow to fuel nozzles 140 (FIG. 3) of primary combustion stage 108 and increase the fuel flow to fuel nozzle(s) 162 (FIG. 3) of secondary combustion stage 110. This modification on the split of fuel flow may be used to maintain PCSET of the combustion gas flow of primary combustion stage 108 substantially constant, i.e., within a predefined target range. That is, the fuel split, rather than IGV position as in previous combustion modes, may be used to regulate PCSET. This allows the position of the IGVs 123 to be used for other control applications, in this example maintaining a constant, subisotherm, exhaust temperature. While no shading is shown, it is understood, some form of a predefined target range is acceptable for combustion modes 6A2 (and subsequent mode 6A). Again, maintaining PCSET within a predefined target range suitable for combustion mode 6A2 results in better emissions control during the loading process shown.

An eighth and final combustion mode, referred to as 6A in FIG. 8, may have load/unload control system 192 activate fuel nozzles denoted PM1, PM2 and PM3 (FIGS. 4-5) in primary combustion stage 108 (all primary combustion stage fuel nozzles) and also all of fuel nozzles 162 of secondary combustion stage 110. The transition may occur, after process P2A (FIG. 7), i.e., in response to load/unload control system 192 determining whether to progress to a next combustion mode. The transition point is indicated with numeral 240 in FIG. 8. Again, PCSET may be maintained during combustion mode 6A, at process P2C in FIG. 7, by load/unload control system 192—see line 249. In the example shown in FIG. 8, fuel split between primary and secondary combustion stages 108, 110 may be used to regulate PCSET. Simultaneously, the position of stage(s) of IGVs 123 are used to keep the exhaust temperature at or below the maximum limit.

As illustrated by FIG. 7 and FIG. 8, for loading by load/unload control system 192, each successive combustion mode of the plurality of progressive combustion modes initially activates a higher number of just first plurality of fuel nozzles 170, 176, 180, 182 (FIGS. 4-5) of the primary combustion stage 108 than a preceding combustion mode. This is the case for combustion modes 1-6, as described, which provide a first set of progressive combustion modes. Subsequently, each successive combustion mode of the plurality of progressive combustion modes may then activate all of the first plurality of fuel nozzles 140 (FIG. 3) of primary combustion stage 108 and more of the second plurality of fuel nozzles 162 (FIG. 3) of secondary combustion stage 110 than a preceding combustion mode. This is the case for combustion modes 6A2 and 6A, as described, which create a second set of progressive combustion modes that follow the first set of progressive combustion modes.

It is emphasized that the combustion modes described herein are only illustrative and that other sequences of combustion modes than described may be employed. For example, successive combustion modes can activate more than one additional fuel nozzle. Furthermore, the first set of progressive combustion modes may use any combination of at least two successive combustion modes selected from: a first mode in which a first number of fuel nozzles of the first plurality of fuel nozzles of the primary combustion stage is activated; a second mode in which a second number of the first plurality of fuel nozzles of the primary combustion stage are activated (second number higher than the first number); a third mode in which a third number of the first plurality of fuel nozzles of the primary combustion stage are activated (third number higher than the first and second numbers); a fourth mode in which a fourth number of the first plurality of fuel nozzles of the primary combustion stage are activated (fourth number higher than the first, second and third numbers); a fifth mode in which a fifth number of the first plurality of fuel nozzles of the primary combustion stage are activated (fifth number higher than the first, second, third and fourth numbers); and a sixth mode in which a full number of the first plurality of fuel nozzles of the primary combustion stage are activated (full number is higher than the first, second, third, fourth and fifth numbers). As noted, during the first set of progressive combustion modes, the second plurality of fuel nozzles 162 of the secondary combustion stage 110 are inactive. As noted, the second set of progressive combustion modes may include a seventh mode in which all of the first plurality of fuel nozzles of the primary combustion stage are activated and a partial number of the second plurality of fuel nozzles of the secondary combustion stage are activated (partial number is less than all of the second plurality of fuel nozzles of the secondary combustion stage); and an eighth mode in which all of the first plurality of fuel nozzles of the primary combustion stage are activated and all of the second plurality fuel nozzles of the secondary combustion stage are activated. In an alternative embodiment, at least one secondary combustion stage 110 fuel nozzle 162 may be activated prior to all of primary combustion zone 108 fuel nozzles 140 being fully activated.

Returning to FIGS. 7 and 8, in process P3, load/unload control system 192 (or GT controller 196) (FIG. 6) may proceed with applying further load to GT system 100 in a conventional fashion. At process P3, as load increases and stages of IGVs 123 open, exhaust temperature Tx will naturally begin to decrease from the isotherm limit. Throughout this remainder of unit loading, i.e., until base load operation is attained, limits that govern the trajectory of the load path may include but are not limited to combustor exit temperature limits (at location 199, FIG. 3), exhaust temperature (Tx) targets, firing temperature targets, limits on temperature rise across combustion section 106, and/or baseload control settings.

Figure 9:
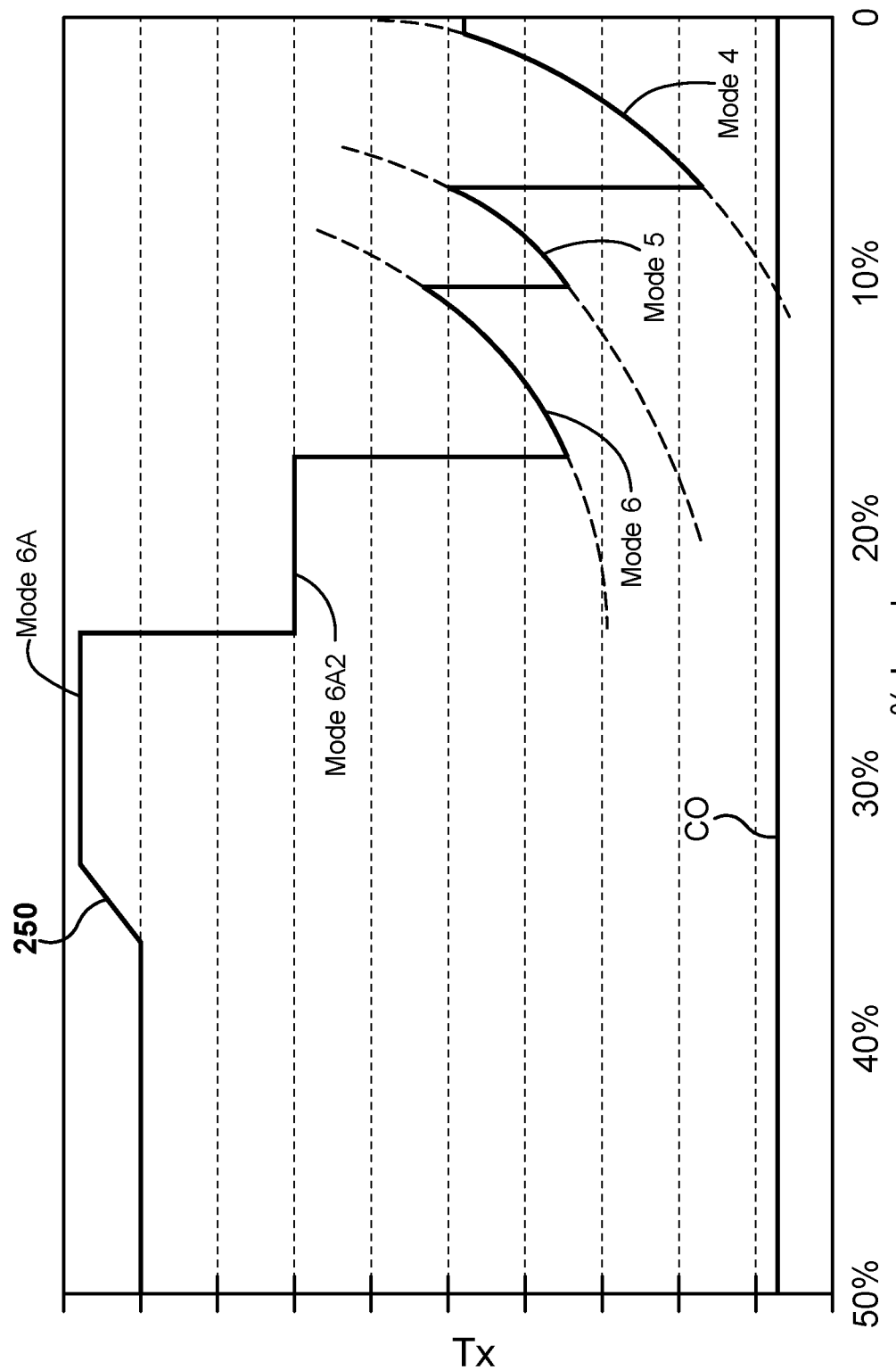
FIG. 9 shows a mission compliant unload path graph plotting exhaust temperature (Tx) versus load from 50% down to FSNL (0% load), and with a schematic rendition of a carbon monoxide (CO) emissions in the GT exhaust in a quasi-steady state with the load path, according to embodiments of the disclosure.

The above-described process is also applicable in an unloading process for GT system 100. In this case, as load/unload control system 192 progresses through each of a plurality of progressive combustion modes, it sequentially activates a lower number of at least one of the first or second plurality of fuel nozzles. FIG. 9 shows an emission compliant unload path graph plotting exhaust temperature (Tx) versus load down from 50%, and with a schematic rendition of a carbon monoxide (CO) amount in the GT exhaust in a quasi-steady state with the load path, according to embodiments of the disclosure. FIG. 9 is generally the inverse of FIG. 8. During unloading, load/unload control system 192 progresses through the plurality of progressive combustion modes including: a first set of progressive combustion modes in which all of the first plurality of fuel nozzles 140 (FIG. 3) of primary combustion stage 108 are activated and in which each successive combustion mode activates a lower number of second plurality of fuel nozzles 162 (FIG. 3) of secondary combustion stage 110 than a preceding combustion mode of the first set of progressive combustion modes. Further, load/unload control system 192 implements a second set of progressive combustion modes, following the first set of progressive combustion modes, during which all of second plurality of fuel nozzles 162 (FIG. 3) of the secondary combustion stage 110 are de-activated and each successive combustion mode activates a lower number of first plurality of fuel nozzles 140 (FIG. 3) of primary combustion stage 108 than a preceding combustion mode of the second set of progressive combustion modes. During each combustion mode, as shown in FIG. 9, PCSET may be maintained by load/unload control system 192 in any now known or later developed fashion. For example, load/unload control system 192 may control at least one of: a fuel flow rate of each fuel nozzle activated during a respective combustion mode; a fuel split between stages 108, 110; or a position of at least one stage of IGVs 123 (FIG. 2) that control an air flow volume to combustion section 106 from compressor 104. Similar to FIG. 8, each combustion mode has a PCSET that is maintained by load/unload control system 192. In one embodiment, progressing to a next successive combustion mode of the plurality of combustion modes occurs in response to one of the following: a compressor pressure ratio of compressor 104 receding below a respective threshold for a current combustion mode. Here, each combustion mode may have a pre-assigned compressor pressure ratio (Pcd) threshold. When the compressor pressure ratio recedes below the threshold, load/unload control system 192 activates less fuel nozzles to move GT system 100 along load path 250 shown in FIG. 9 to the next combustion mode, if more combustion modes exist. In an alternative embodiment, certain combustion mode(s) may temporarily activate more fuel nozzles during the unloading.

As described herein and shown in FIG. 6, GT control system 194 (including load/unload control system 192) can include any conventional control system components used in controlling a GT system 100. For example, GT control system 194 can include electrical and/or electro-mechanical components for actuating one or more components in the GT system 100. Control system 194 can include conventional computerized sub-components such as a processor, memory, input/output, bus, etc. GT control system 194 can be configured (e.g., programmed) to perform functions based upon operating conditions from an external source (e.g., at least one computing device 200), and/or may include pre-programmed (encoded) instructions based upon parameters of GT system 100.

As noted herein, GT control system 194 can also include at least one computing device 200 connected (e.g., hard-wired and/or wirelessly) with GT controller 196, load/unload control system 192, and other parts of GT system 100 such as valves 190. In various embodiments, computing device 200 is operably connected with valves 190 and other parts of GT system 100, e.g., via a plurality of conventional sensors such as flow meters, temperature sensors, etc., as described herein. Computing device 200 can be communicatively connected with GT controller 196, e.g., via conventional hard-wired and/or wireless means. GT control system 194 is configured to monitor GT system 100 during operation according to various embodiments.

Further, computing device 200 is shown in communication with a user 210. A user 210 may be, for example, a programmer or operator. Interactions between these components and computing device 200 are discussed elsewhere in this application.

As noted herein, one or more of the processes described herein can be performed, e.g., by at least one computing device, such as computing device 200, as described herein. In other cases, one or more of these processes can be performed according to a computer-implemented method. In still other embodiments, one or more of these processes can be performed by executing computer program code (e.g., load/unload control system 192) on at least one computing device (e.g., computing device 200), causing the at least one computing device to perform a process, e.g., progressing through combustion modes according to approaches described herein.

In further detail, computing device 200 is shown including a processing component 212 (e.g., one or more processors), a storage component 214 (e.g., a storage hierarchy), an input/output (I/O) component 216 (e.g., one or more I/O interfaces and/or devices), and a communications pathway 218. In one embodiment, processing component 212 executes program code, such as load/unload control system 192, which is at least partially embodied in storage component 214. While executing program code, processing component 212 can process data, which can result in reading and/or writing the data to/from storage component 214 and/or I/O component 216 for further processing. Pathway 218 provides a communications link between each of the components in computing device 200. I/O component 216 can comprise one or more human I/O devices or storage devices, which enable user 210 to interact with computing device 200 and/or one or more communications devices to enable user 210 and/or other GT component(s) 208 to communicate with computing device 214 using any type of communications link. To this extent, GT control system 194 can manage a set of interfaces (e.g., graphical user interface(s), application program interface, and/or the like) that enable human and/or system interaction with control system 194.

In any event, computing device 200 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, GT control system 194 (and load/unload control system 192) can be embodied as any combination of system software and/or application software. In any event, the technical effect of computing device 200 is to progress through combustion modes during a load/unload of GT system 100 according to various embodiments herein.

Further, GT control system 194 (and load/unload control system 192) can be implemented using a set of modules 220. In this case, a module 220 can enable computing device 200 to perform a set of tasks used by GT control system 194, and can be separately developed and/or implemented apart from other portions of GT control system 194. GT control system 194 may include modules 220 which comprise a specific use for machine/hardware and/or software. Regardless, it is understood that two or more modules, and/or systems may share some/all of their respective hardware and/or software. Further, it is understood that some of the functionality discussed herein may not be implemented or additional functionality may be included as part of computing device 200.

When computing device 200 comprises multiple computing devices, each computing device may have only a portion of GT control system 194 (and/or load/unload control system 192) embodied thereon (e.g., one or more modules 220). However, it is understood that computing device 200 and GT control system 194 are only representative of various possible equivalent computer systems that may perform a process described herein. To this extent, in other embodiments, the functionality provided by computing device 200 and GT control system 194 can be at least partially implemented by one or more computing devices that include any combination of general and/or specific purpose hardware with or without program code. In each embodiment, the hardware and program code, if included, can be created using standard engineering and programming techniques, respectively.

Regardless, when computing device 200 includes multiple computing devices, the computing devices can communicate over any type of communications link. Further, while performing a process described herein, computing device 200 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, GT control system 194 (and load/unload control system 192) enables computing device 200 to control and/or monitor combustion section 106. GT control system 194 may include logic for performing one or more actions described herein. In one embodiment, GT control system 194 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, GT control system 194 (and load/unload control system 192) and logic included therein will be described herein as a specific use machine. As will be understood from the description, while logic is illustrated as including each of the above-stated functions, not all of the functions are necessary according to the teachings of the invention as recited in the appended claims.

In various embodiments, GT control system 194 may be configured to monitor operating parameters of combustion section 106, i.e., each combustor 106 therein, as described herein. Additionally, GT control system 194 is configured to control combustion section 106, according to various functions described herein.

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

The technical effect of the various embodiments of the disclosure, including, e.g., the GT control system 194 and load/unload control system 192, is to run a load/unload method for GT system 100, as described herein. The teachings of the disclosure can be applied to any GT system 100 with two combustion stages to significantly drop emissions at low load. During loading, for example, teachings of the disclosure minimize CO emissions during startup to achieve emissions compliance down to FSNL.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A gas turbine (GT) system, comprising:
   a compressor;
   a combustion section including a plurality of combustors, at least one of the plurality of combustors including a primary combustion stage, the primary combustion stage including a first plurality of fuel nozzles, and a secondary combustion stage downstream from the primary combustion stage, the secondary combustion stage including a second plurality of fuel nozzles, the at least one of the plurality of combustors having a primary combustion stage exit temperature of a combustion flow between the primary combustion stage and the secondary combustion stage;
   a turbine section downstream of the combustion section;
   a control system coupled to the combustion section and configured for, during operating the gas turbine (GT) system:
   progressing through each of a plurality of progressive combustion modes, each of the plurality of progressive combustion modes defining a respective predefined target range for the primary combustion stage exit temperature of the combustion gas flow; wherein the plurality of progressive combustion modes includes at least a fifth mode, a sixth mode, and a seventh mode;
   wherein only a portion of the first plurality of fuel nozzles is activated in the fifth mode and none of the second plurality of fuel nozzles are activated in the fifth mode;
   wherein all of the first plurality of fuel nozzles are activated in the sixth mode and none of the second plurality of fuel nozzles are activated in the sixth mode, and
   wherein all of the first plurality of fuel nozzles are activated in the seventh mode and only a portion of the second plurality of fuel nozzles are activated in the seventh mode; and
   controlling the primary combustion stage exit temperature of the combustion gas flow to be within the respective predefined target range corresponding to the respective combustion mode during the progressing through each of the plurality of progressive combustion modes; and
   wherein the progressing further includes:
   unloading the gas turbine (GT) system by sequentially progressing from at least the seventh mode to the sixth mode to the fifth mode, and
   loading the gas turbine (GT) system by sequentially progressing from at least the fifth mode to the sixth mode to the seventh mode, and
   wherein during the loading while progressing to the seventh mode from the sixth mode, modifying a split of fuel flow between the primary combustion stage and the secondary combustion stage by decreasing a fuel flow to the first plurality of fuel nozzles and increasing a fuel flow to the second plurality of fuel nozzles, thereby maintaining the primary combustion stage exit temperature of the combustion gas flow within the respective predefined target range of the seventh mode.

2. The gas turbine (GT) system of claim 1, wherein the progressing further includes:
   during the loading of the gas turbine (GT) system, further sequentially progressing from the seventh mode to an eighth mode of the plurality of progressive combustion modes, wherein all of the first plurality of fuel nozzles are activated in the eighth mode and all of the second plurality of fuel nozzles are activated in the eighth mode; and
   during the unloading of the gas turbine (GT) system, further sequentially progressing from the fifth mode to a fourth mode of the plurality of progressive combustion modes, wherein in the fourth mode a lower number of the first plurality of fuel nozzles are activated than in the fifth mode and none of the second plurality of fuel nozzles are activated.

3. The gas turbine (GT) system of claim 1, wherein the controlling the primary combustion stage exit temperature of the combustion gas flow to be within the respective predefined target range during the progressing through each of the plurality of progressive combustion modes further includes controlling:
   a position of at least one stage of inlet guide vanes that control an air flow volume to the combustion section from the compressor.

4. The gas turbine (GT) system of claim 1, wherein the sequential progressing from the fifth mode to the sixth mode during the loading of the gas turbine (GT) system is in response to:
   a compressor pressure ratio of the compressor exceeding a threshold.

5. The gas turbine (GT) system of claim 1, wherein the plurality of progressive combustion modes includes:
   a first set of progressive combustion modes including a fourth mode, the fifth mode and the sixth mode, wherein in the fourth mode a number of the first plurality of fuel nozzles activated is lower than in the fifth mode; and
   a second set of progressive combustion modes including the seventh mode and an eighth mode.

6. The gas turbine (GT) system of claim 5, wherein the first set of progressive combustion modes further includes a first mode, a second mode, and a third mode;
   the first mode in which a first number of fuel nozzles of the first plurality of fuel nozzles of the primary combustion stage are activated;
   the second mode in which a second number of the first plurality of fuel nozzles of the primary combustion stage are activated, wherein the second number is higher than the first number;
   the third mode in which a third number of the first plurality of fuel nozzles of the primary combustion stage are activated, wherein the third number is higher than each of the first and second numbers;
   the fourth mode in which a fourth number of the first plurality of fuel nozzles of the primary combustion stage are activated, wherein the fourth number is higher than each of the first, second and third numbers;

wherein during the first set of progressive combustion modes, the second plurality of fuel nozzles of the secondary combustion stage are inactive.

7. The gas turbine (GT) system of claim 6, wherein the eighth mode in which all of the first plurality of fuel nozzles of the primary combustion stage are activated and all of the second plurality fuel nozzles of the secondary combustion stage are activated.

8. A non-transitory computer readable storage medium including code for a control system of a gas turbine (GT) system, the code configured to control a combustion section including a plurality of combustors for a of the gas turbine (GT) system, at least one of the plurality of combustors including a primary combustion stage, the primary combustion stage including a first plurality of fuel nozzles, and a secondary combustion stage downstream from the primary combustion stage, the secondary combustion stage including a second plurality of fuel nozzles, the at least one of the plurality of combustors having a primary combustion stage exit temperature of a combustion gas flow between the primary combustion stage and the secondary combustion stage, the code performing the following during operating of the gas turbine (GT) system:
progressing through each of a plurality of progressive combustion modes, each of the plurality of progressive combustion modes defining a respective predefined target range for the primary combustion stage exit temperature of the combustion gas flow; wherein the plurality of progressive combustion modes includes at least a fifth mode, a sixth mode, and a seventh mode;
wherein only a portion of the first plurality of fuel nozzles is activated in the fifth mode and none of the second plurality of fuel nozzles are activated in the fifth mode;
wherein all of the first plurality of fuel nozzles are activated in the sixth mode and none of the second plurality of fuel nozzles are activated in the sixth mode, and
wherein all of the first plurality of fuel nozzles are activated and only a portion of the second plurality of fuel nozzles is activated in the seventh mode; and
controlling the primary combustion stage exit temperature of the combustion gas flow to be within the respective predefined target range corresponding to the respective combustion mode during the progressing through each of the plurality of progressive combustion modes; and
wherein the progressing further includes:
unloading the gas turbine (GT) system by sequentially progressing from at least the seventh mode to the sixth mode to the fifth mode, and
loading the gas turbine (GT) system by sequentially progressing from at least the fifth mode to the sixth mode to the seventh mode, and
wherein during the loading while progressing to the seventh mode from the sixth mode, modifying a split of fuel flow between the primary combustion stage and the secondary combustion stage by decreasing a fuel flow to the first plurality of fuel nozzles and increasing a fuel flow to the second plurality of fuel nozzles, thereby maintaining the primary combustion stage exit temperature of the combustion gas flow within the respective predefined target range of the seventh mode.

9. The non-transitory computer readable storage medium including code of claim 8, wherein the progressing further includes:
during the loading of the gas turbine (GT) system, further sequentially progressing from the seventh mode to an eighth mode of the plurality of progressive combustion modes, wherein all of the first plurality of fuel nozzles are activated in the eighth mode and all of the second plurality of fuel nozzles are activated in the eighth mode; and
during the unloading of the gas turbine (GT) system, further sequentially progressing from the fifth mode to a fourth mode of the plurality of progressive combustion modes, wherein in the fourth mode a lower number of the first plurality of fuel nozzles are activated than in the fifth mode and none of the second plurality of fuel nozzles are activated in the fifth mode.

10. The non-transitory computer readable storage medium including code of claim 8, wherein the controlling the primary combustion stage exit temperature of the combustion gas flow to be within the respective predefined target range during the progressing through each of the plurality of progressive combustion modes further includes controlling:
a position of at least one stage of inlet guide vanes that control an air flow volume to the combustion section from a compressor of the gas turbine (GT) system.

11. The non-transitory computer readable storage medium including code of claim 8, wherein the sequential progressing from the fifth mode to the sixth mode during the loading of the gas turbine (GT) system is in response to
a compressor pressure ratio of the compressor exceeding a threshold.

12. The non-transitory computer readable storage medium including code of claim 8, wherein, the plurality of progressive combustion modes includes:
a first set of progressive combustion modes including a fourth mode, the fifth mode and the sixth mode, wherein in the fourth mode a number of the first plurality of fuel nozzles activated is lower than in the fifth mode; and
a second set of progressive combustion modes including the seventh mode and an eighth mode.

13. The non-transitory computer readable storage medium including code of claim 12, wherein the first set of progressive combustion modes further includes a first mode, a second mode, and a third mode;
the first mode in which a first number of fuel nozzles of the first plurality of fuel nozzles of the primary combustion stage are activated;
the second mode in which a second number of the first plurality of fuel nozzles of the primary combustion stage are activated, wherein the second number is higher than the first number;
the third mode in which a third number of the first plurality of fuel nozzles of the primary combustion stage are activated, wherein the third number is higher than each of the first and second numbers;
the fourth mode in which a fourth number of the first plurality of fuel nozzles of the primary combustion stage are activated, wherein the fourth number is higher than each of the first, second and third numbers;
wherein during the first set of progressive combustion modes, the second plurality of fuel nozzles of the secondary combustion stage are inactive.

14. The non-transitory computer readable storage medium including code of claim 13, wherein
the eighth mode in which all of the first plurality of fuel nozzles of the primary combustion stage are activated and all of the second plurality fuel nozzles of the secondary combustion stage are activated.

* * * * *